US012639486B2

(12) United States Patent
Mahajan et al.

(10) Patent No.: US 12,639,486 B2
(45) Date of Patent: May 26, 2026

(54) EQUIPMENT LAYOUT DESIGN SUPPORT DEVICE AND EQUIPMENT LAYOUT DESIGN SUPPORT METHOD

(71) Applicant: Rakuten Symphony, Inc., Tokyo (JP)

(72) Inventors: Abhay Mahajan, Tokyo (JP); Kunal Khanwilkar, Capitagreen (SG); Rahul Atri, Capitagreen (SG)

(73) Assignee: RAKUTEN SYMPHONY, INC., Tokyo (JP)

( * ) Notice: Subject to any disclaimer, the term of this patent is extended or adjusted under 35 U.S.C. 154(b) by 1002 days.

(21) Appl. No.: 17/789,997

(22) PCT Filed: Sep. 28, 2020

(86) PCT No.: PCT/IB2020/059033
§ 371 (c)(1),
(2) Date: Jun. 29, 2022

(87) PCT Pub. No.: WO2022/064261
PCT Pub. Date: Mar. 31, 2022

(65) Prior Publication Data
US 2023/0045683 A1 Feb. 9, 2023

(51) Int. Cl.
*G06F 30/13* (2020.01)
*G06F 30/20* (2020.01)
(Continued)

(52) U.S. Cl.
CPC .............. *G06F 30/13* (2020.01); *G06F 30/20* (2020.01); *G06F 9/451* (2018.02); *G06F 30/12* (2020.01); *G06F 2113/02* (2020.01)

(58) Field of Classification Search
CPC .......... G06F 30/13; G06F 30/20; G06F 9/451; G06F 30/12; G06F 2113/02
See application file for complete search history.

(56) References Cited

U.S. PATENT DOCUMENTS

2008/0091387 A1* 4/2008 Yamazaki ............. H04L 41/145
703/1
2010/0274536 A1* 10/2010 Okada .............. G05B 19/41885
703/1
(Continued)

FOREIGN PATENT DOCUMENTS

JP 2003-058746 A 2/2003
JP 2007-122329 A 5/2007
(Continued)

OTHER PUBLICATIONS

International Search Report for PCT/IB2020/059033 dated Nov. 24, 2020.
Written Opinion for PCT/IB2020/059033 dated Nov. 24, 2020.

*Primary Examiner* — Brian W Wathen
(74) *Attorney, Agent, or Firm* — Sughrue Mion, PLLC

(57) ABSTRACT

A setting screen controller 50 of an equipment layout design support device 10 controls a setting screen for receiving selection of a device to be housed in a rack, and setting related to a housing destination slot and connection between devices. A device information obtainer 56 reads catalog information and inventory quantity of the device from a device information storage 66, and provides the read information to the setting screen controller 50. A setting information outputter 54 associates the settings with characteristics of the rack and stores the information in a rack information storage 64. The setting screen controller 50 displays the stored rack setting information in a selectable manner at the time of setting rack arrangement in an installation location.

11 Claims, 15 Drawing Sheets

(51) Int. Cl.
  *G06F 9/451*     (2018.01)
  *G06F 30/12*     (2020.01)
  *G06F 113/02*    (2020.01)

(56)       References Cited

U.S. PATENT DOCUMENTS

| | | | |
|---|---|---|---|
| 2011/0106501 A1* | 5/2011 | Christian | H04L 67/51 |
| | | | 703/1 |
| 2012/0209573 A1* | 8/2012 | Karrat | G06Q 10/067 |
| | | | 703/1 |
| 2015/0221109 A1* | 8/2015 | Klein | H04L 49/555 |
| | | | 345/440 |
| 2015/0324487 A1* | 11/2015 | Lee | G06F 30/00 |
| | | | 703/21 |
| 2016/0140259 A1* | 5/2016 | Ponamgi | H04L 41/145 |
| | | | 703/1 |
| 2016/0140868 A1* | 5/2016 | Lovett | G09B 19/0053 |
| | | | 434/118 |
| 2021/0073434 A1* | 3/2021 | Levy | G06V 10/235 |
| 2021/0073440 A1* | 3/2021 | Austern | G06Q 10/0875 |

FOREIGN PATENT DOCUMENTS

| | | |
|---|---|---|
| JP | 2012-093830 A | 5/2012 |
| JP | 2019-125026 A | 7/2019 |
| JP | 2019-164528 A | 9/2019 |

* cited by examiner

FIG.1

DEVICE MANAGEMENT SYSTEM

FACILITY MANAGEMENT SYSTEM

EQUIPMENT LAYOUT DESIGN SUPPORT DEVICE

14

16

18

20

8

10

11

12

1

FIG.4
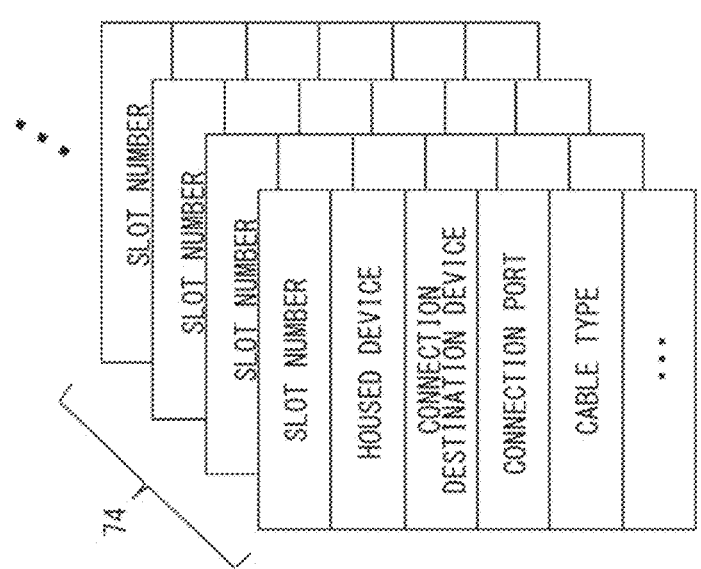
74
| SLOT NUMBER |
| HOUSED DEVICE |
| CONNECTION DESTINATION DEVICE |
| CONNECTION PORT |
| CABLE TYPE |
| ... |
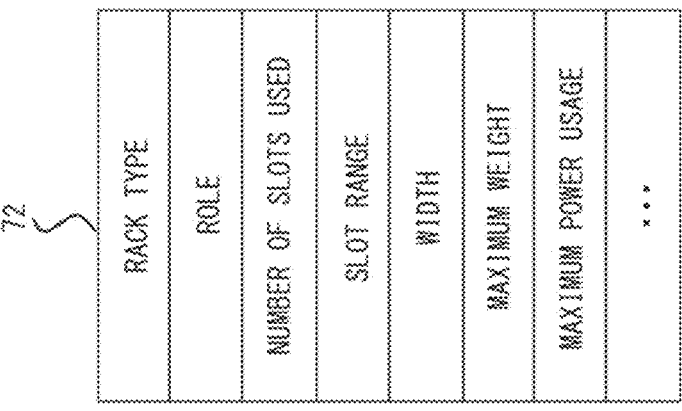
72
| RACK TYPE |
| ROLE |
| NUMBER OF SLOTS USED |
| SLOT RANGE |
| WIDTH |
| MAXIMUM WEIGHT |
| MAXIMUM POWER USAGE |
| ... |
70
| IDENTIFICATION NUMBER |
| TEMPLATE NAME |
| RACK IDENTIFICATION INFORMATION |
| STATUS |
| FACILITY TYPE |
| CREATOR |
| CREATION DATE/TIME |
| ... |

FIG.8

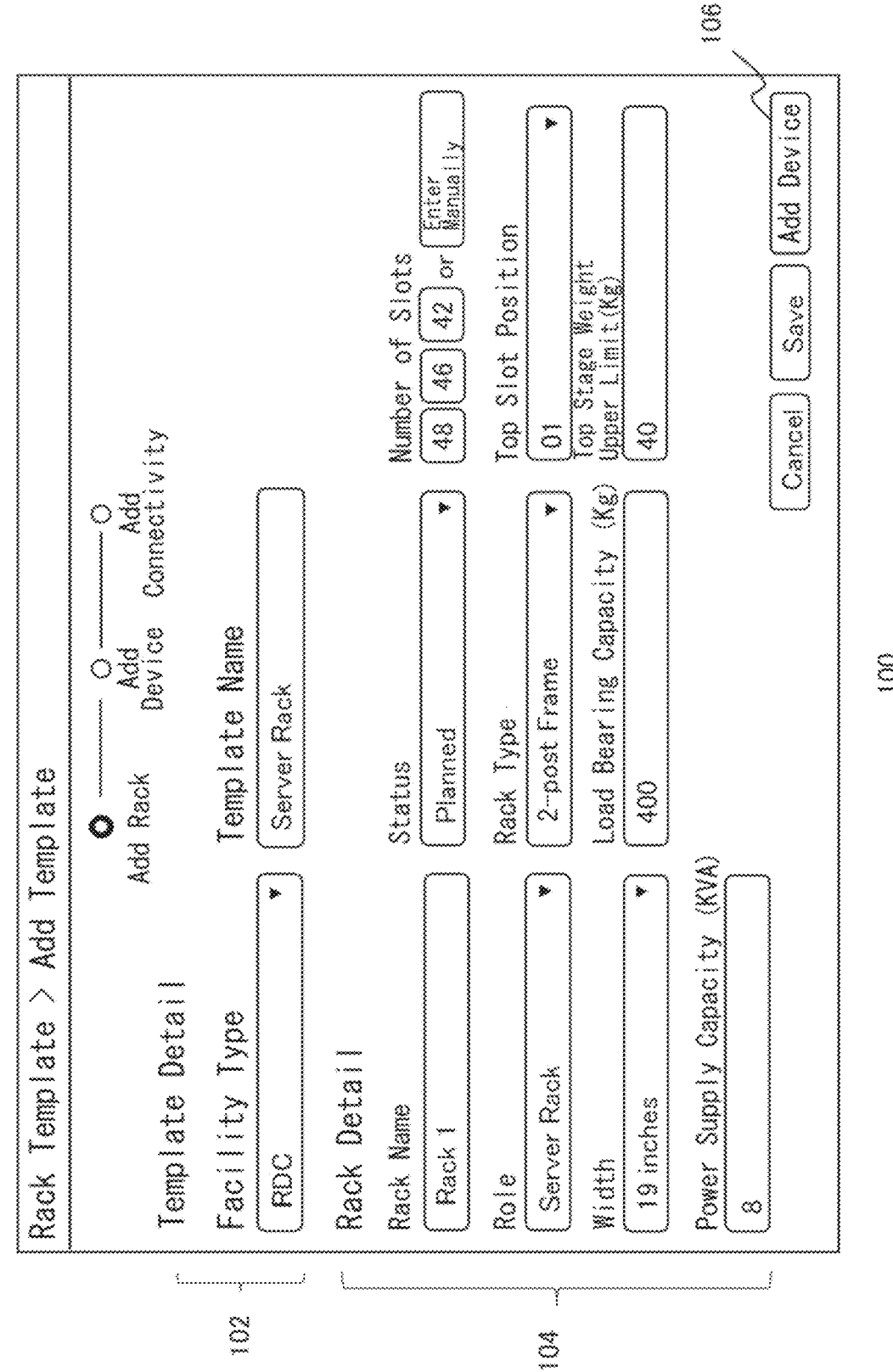

Rack Template > Add Template

○ ──── ○ ──── ○
Add Rack    Add Device    Add Connectivity

Template Detail

Facility Type
RDC ▾

Template Name
Server Rack

Rack Detail

Rack Name
Rack 1

Status
Planned ▾

Number of Slots
48  46  42  or  Enter Manually

Role
Server Rack ▾

Rack Type
2-post Frame ▾

Top Slot Position
01 ▾
Top Stage Weight Upper Limit (Kg)
40

Width
19 inches ▾

Load Bearing Capacity (Kg)
400

Power Supply Capacity (KVA)
8

Cancel    Save    Add Device

106

100

102

104

EQUIPMENT LAYOUT DESIGN SUPPORT DEVICE AND EQUIPMENT LAYOUT DESIGN SUPPORT METHOD

CROSS REFERENCE TO RELATED APPLICATIONS

This application is a National Stage of International Application No. PCT/IB2020/059033 filed Sep. 28, 2020.

TECHNICAL FIELD

The present invention relates to a device and a method for supporting layout design when installing a plurality of equipment.

BACKGROUND ART

The importance of facilities such as a data center in which devices such as various computers and power supply devices are gathered in one place has increased with the expansion of services via a network and the like. In such facilities, devices are generally stored and managed in a large number of racks. In order to stably operate services, inspection and proper management of devices are essential. For this reason, a technique for easily identifying and managing many racks and devices has been proposed (see, for example, Patent Literature 1).

CITATION LIST

Patent Literature

[Patent Literature 1] JP 2019-125026 A

SUMMARY OF INVENTION

Technical Problem

According to the above technique, it is possible to reduce troublesome work of a manager and suppress human errors during inspection at the operation stage of the existing facility. On the other hand, even at a layout design stage such as starting up a new facility or adding a device to the existing facility, a large number of processes are generated such as sorting of devices, examination of a storage position and cable connection in a rack, arrangement determination of a rack itself, and association between a device and a housing position. Works for suitably arranging a wide variety of devices and accurately connecting the devices by cables are burdensome and still need to be considered from various viewpoints such as power supply capacity and weight limit at their installation locations. Therefore, a technique for improving efficiency of such works is desired.

The present invention has been made in view of such problems, and an object of the present invention is to provide a technique capable of improving efficiency of design work of a equipment layout in a facility including a plurality of devices.

Solution to Problem

One aspect of the present invention relates to an equipment layout design support device. The equipment layout design support device includes a setting screen controller structured to control a setting screen that receives setting related to characteristics of a rack used for housing equipment and equipment to be housed in the rack; an input information obtainer structured to obtain setting information input by a user on the setting screen; and a setting information outputter structured to store the setting information in a rack information storage.

Another aspect of the present invention relates to an equipment layout design support method. The equipment layout design support method includes the steps of controlling a setting screen that receives setting related to characteristics of a rack used for housing equipment and equipment to be housed in the rack; obtaining setting information input by a user on the setting screen; and storing the setting information in a rack information storage.

Note that arbitrary combinations of the above components and modifications of the expressions of the present invention between a method, an apparatus, a system, a computer program, a recording medium recording the computer program, and the like are also effective as aspects of the present invention.

Advantageous Effects of Invention

According to the present invention, it is possible to improve efficiency of design work of equipment layout in a facility including a plurality of devices.

BRIEF DESCRIPTION OF DRAWINGS

FIG. 1 is a diagram illustrating an example of a configuration of a data center management system to which the present embodiment is applicable.

FIG. 4 is a diagram illustrating an example of a data structure of a rack template output by the equipment layout design support device in the present embodiment.

FIG. 8 is a diagram illustrating an example of a setting screen for basic information of the rack displayed in S14 of FIG. 6.

DESCRIPTION OF EMBODIMENTS

Figure 1:
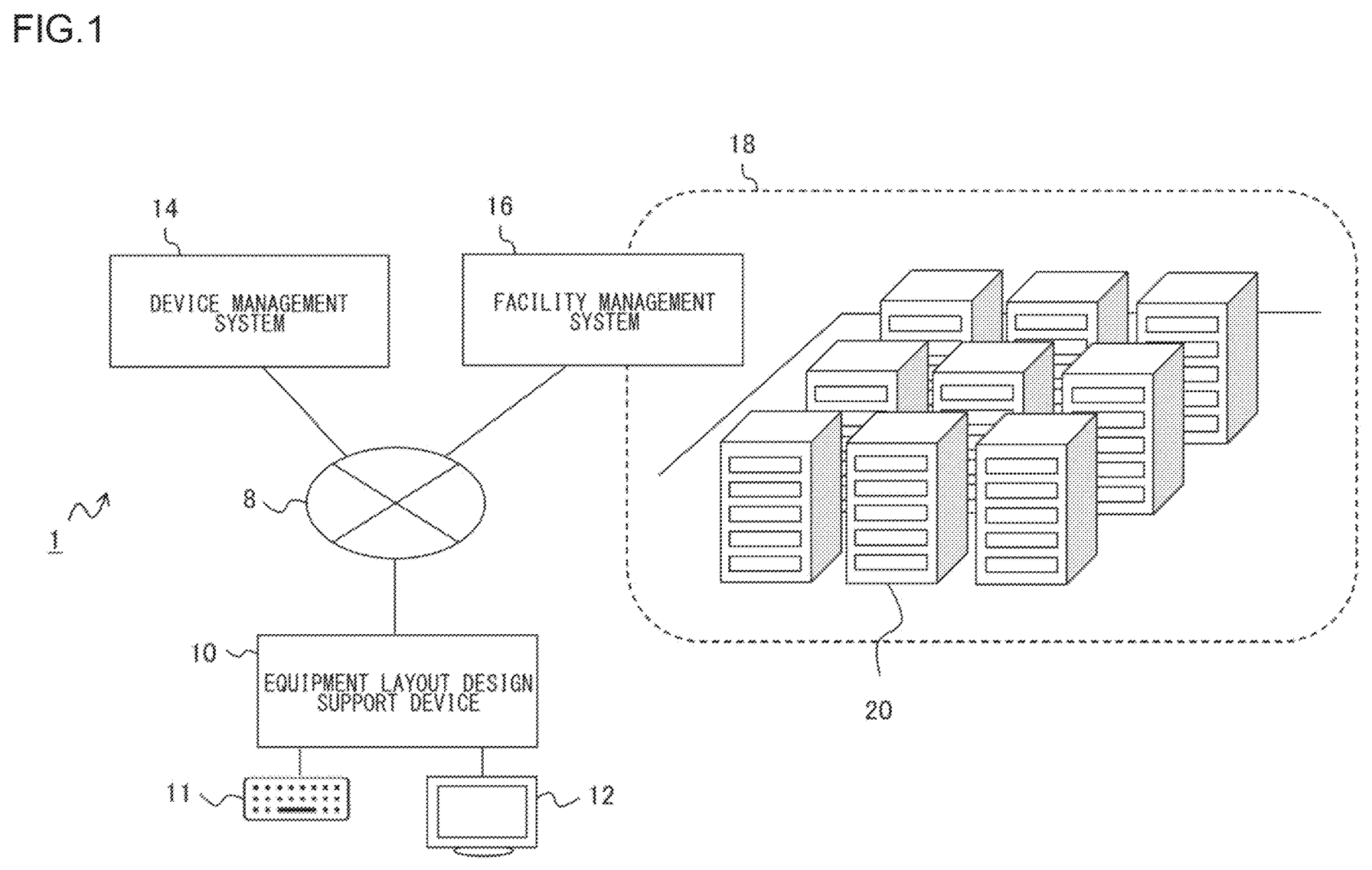
Figure 2:
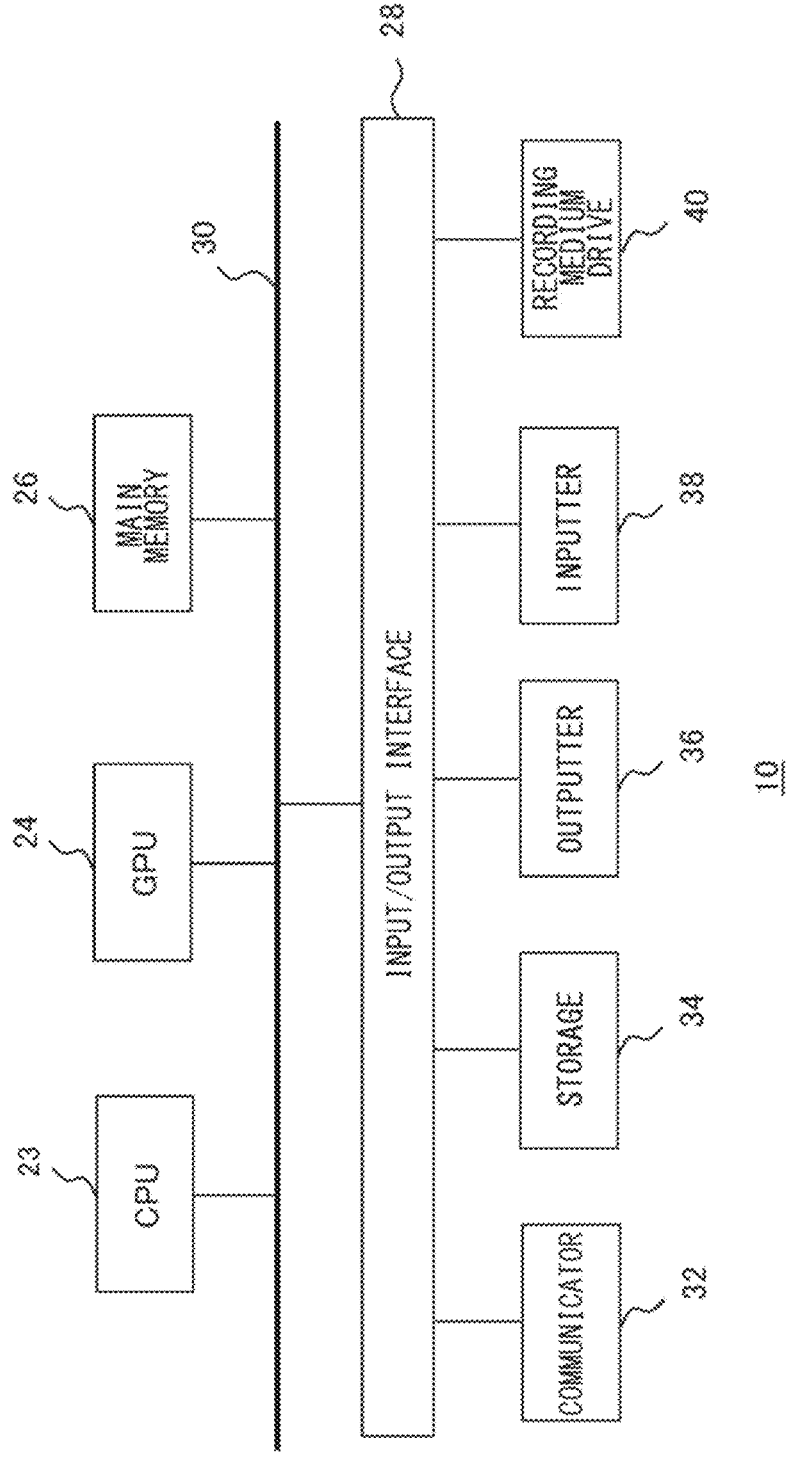
FIG. 2 is a diagram illustrating an internal circuit configuration of an equipment layout design support device according to the present embodiment.

The present embodiment relates to at least a technique for supporting a user's work of choosing a device to be housed in a rack having a plurality of slots and determining a housing destination slot or a connection relationship. A kind, a purpose, and the like of a facility for installing the rack are not particularly limited, and a data center will be described below as an example. FIG. 1 illustrates an example of a configuration of a data center management system to which the present embodiment is applicable.

In this example, a data center management system 1 has a configuration in which an equipment layout design support device 10, a device management system 14, and a facility management system 16 are connected to a network 8 such as a local area network (LAN) or a wide area network (WAN). The equipment layout design support device 10 supports a user's work of determining a configuration of a rack (e.g., a rack 20) planned to be installed in the data center 18. Here, the configuration of the rack is at least any of a rack type, a housing target device, a housing destination slot, and a connection relationship between devices. Furthermore, the user is a designer, an operation manager, or the like of the data center 18.

The equipment layout design support device 10 may support a user's work of updating configurations of racks already installed in the data center 18. In addition, the equipment layout design support device 10 may support a work of planning rack arrangement on the floor in the data center 18. As illustrated, an input device 11 for the user to input various settings and a display device 12 for displaying a setting screen are connected to the equipment layout design support device 10.

The input device 11 may be any of general input means such as a keyboard, a touch panel, and a controller. The display device 12 may be any of general display means such as a liquid crystal display and an organic EL display. At least either of the input device 11 and the display device 12 may be integrally implemented with the equipment layout design support device 10. For example, the present invention may be implemented by a tablet terminal integrally including these three devices.

The device management system 14 is, for example, a system of a purchasing department in a company that operates the data center 18, and manages catalog information on and inventory quantity of devices housed in a rack. The device management system 14 may include a server that provides product information at a manufacturer or a vendor of the device. When the user chooses a device to be housed in a rack, information on devices is made available by providing the information from the device management system 14 to the equipment layout design support device 10, so that the user can efficiently compare and examine the devices and easily pick out an optimal device.

The facility management system 16 manages a rack actually arranged in the data center 18 and a housed device. That is, the actually arranged rack and device are managed based on the configuration of the rack and the arrangement on the floor in the data center 18, which are determined using the equipment layout design support device 10. When the equipment layout design support device 10 provides the user's setting information related to the configuration of the rack and the arrangement on the floor, the facility management system 16 can automatically recognize positional relationship of the device and the rack actually installed thereafter and update information thereof.

FIG. 2 illustrates an internal circuit configuration of the equipment layout design support device 10. The equipment layout design support device 10 includes a central processing unit (CPU) 23, a graphics processing unit (GPU) 24, and a main memory 26. These units are connected to each other via a bus 30. An input/output interface 28 is further connected to the bus 30. A communicator 32 that establishes communication with the device management system 14 and the facility management system 16, a storage 34 such as a hard disk drive and a nonvolatile memory, an outputter 36 that outputs data to the display device 12, an inputter 38 that inputs data from the input device 11, and a recording medium drive 40 that drives a removable recording medium such as a magnetic disk, an optical disk, or a semiconductor memory are connected to the input/output interface 28.

The CPU 23 controls the entire equipment layout design support device 10 by executing an operating system stored in the storage 34. The CPU 23 also executes various programs that have been read from the removable recording medium and loaded into the main memory 26. The GPU 24 generates a display image according to a drawing instruction from the CPU 23 and outputs the display image to the outputter 36. The main memory 26 includes a random-access memory (RAM), and stores programs and data necessary for processing.

Figure 3:
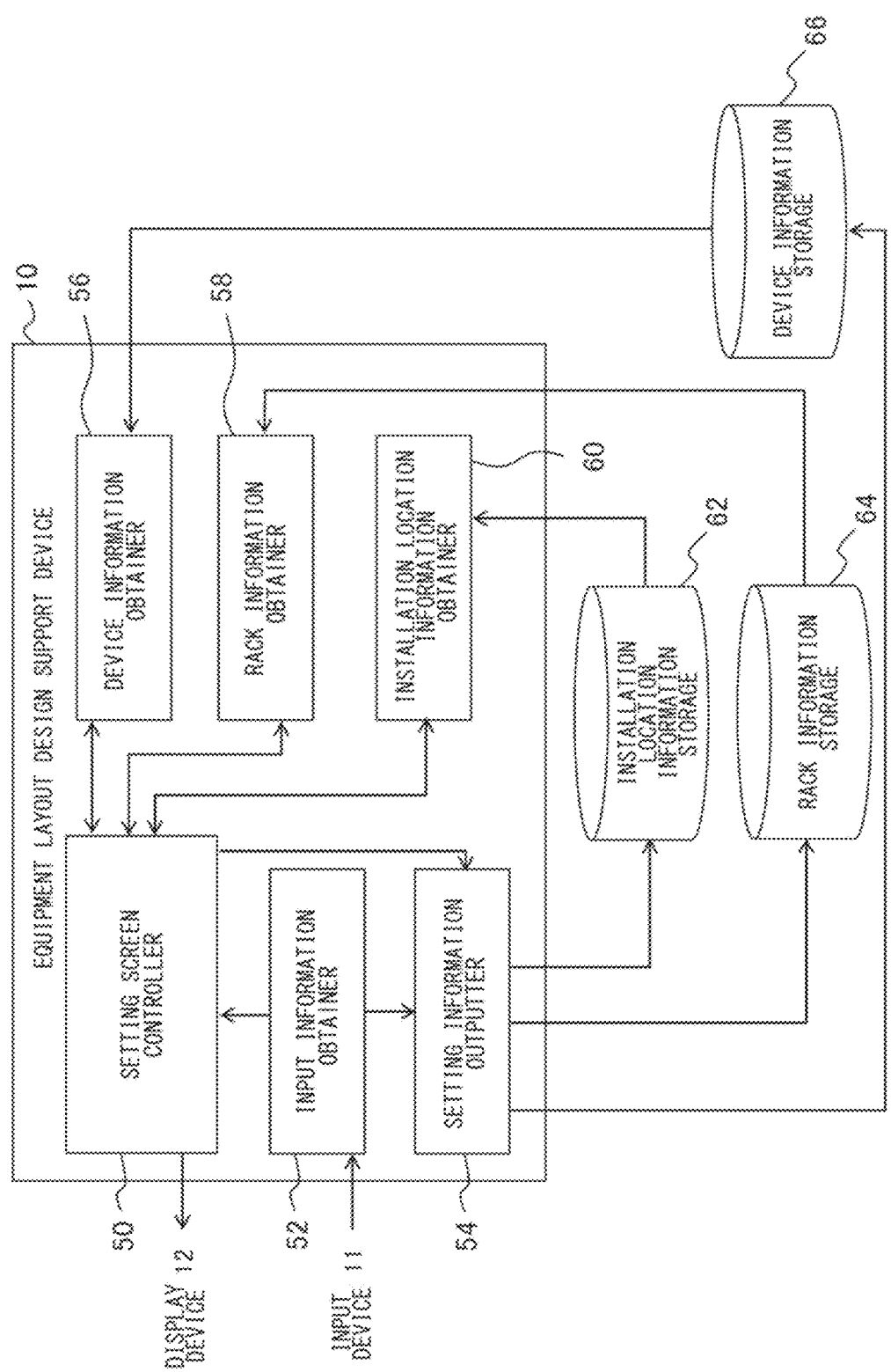
FIG. 3 is a diagram illustrating a configuration of functional blocks of the equipment layout design support device and various storages according to the present embodiment.

FIG. 3 illustrates a configuration of functional blocks of the equipment layout design support device 10 and various storages according to the present embodiment. Each functional block illustrated in FIG. 3 can be implemented by an electronic component such as the CPU or the main memory illustrated in FIG. 2 in terms of hardware, and is implemented by a program that exhibits various functions such as a data input function, a data holding function, an image processing function, and a communication function loaded from a recording medium or the like into the main memory in terms of software. Therefore, it is understood by those skilled in the art that these functional blocks can be implemented in various forms by hardware alone, software alone, or a combination thereof, and the functional blocks are not limited to any of them.

The equipment layout design support device 10 includes a setting screen controller 50 that controls a setting screen, an input information obtainer 52 that receives a setting input by the user, a setting information outputter 54 that outputs a setting result, a device information obtainer 56 that obtains information related to a device, a rack information obtainer 58 that obtains information related to a rack, and an installation location information obtainer 60 that obtains information related to an installation location of the rack. The equipment layout design support device 10 is connected to a device information storage 66, a rack information storage 64, and an installation location information storage 62.

At least any of the device information storage 66, the rack information storage 64, and the installation location information storage 62 may be mounted inside a storage apparatus directly connected to the equipment layout design support device 10, or may be mounted in another system connected via the network 8. For example, the device information storage 66 may be included in the device management system 14 of FIG. 1. The rack information storage 64 and the installation location information storage

62 may be included in the facility management system 16. Alternatively, at least any of the device information storage 66, the rack information storage 64, and the installation location information storage 62 may be mounted in the storage 34 of the equipment layout design support device 10 itself.

The setting screen controller 50 causes the display device 12 to display a screen for setting the configuration of the rack. Specifically, the setting screen controller 50 controls the screen that receives the setting related to at least any of a kind of rack, a housing target device, a housing destination slot for the device, and cable connection between devices. The setting screen controller 50 displays, on the setting screen, a user selectable target and information that serves as a basis for setting with respect to each setting item. Therefore, the setting screen controller 50 obtains the information on a device as an option from the device information obtainer 56 and the information related to the rack type as an option and a housing status from the rack information obtainer 58.

In addition, the setting screen controller 50 may obtain, from the installation location information obtainer 60, information related to restrictions on the facility such as a weight limit and a maximum power supply capacity at a location where the rack is planned to be installed. The setting screen controller 50 may further cause the display device 12 to display for the rack for which various settings have been completed, a screen for planning a room where the rack is installed and the arrangement on the floor. In this case, the setting screen controller 50 obtains information on a location where a rack can be newly installed from the installation location information obtainer 60.

The input information obtainer 52 obtains information input by the user on the setting screen displayed on the display device 12 via the input device 11. Here, the information input by the user includes information for appropriately expanding contents to be displayed, such as a search condition, and setting information such as a rack, a device, and a connection relationship. The input information obtainer 52 appropriately supplies these pieces of information to the setting screen controller 50 and the setting information outputter 54.

According to a request from the setting screen controller 50 that has obtained the user input information, the device information obtainer 56 obtains information on a housing candidate device from the device information storage 66 and provides the information to the setting screen controller 50. For example, the device information obtainer 56 provides detailed information on a device that matches the search condition input by the user. The detailed information on the device is, for example, at least any of a product name, a material name, a material code, a hardware name, a vendor, a role, a voltage, a current, an electrical power, a price, a weight, a connectable port, an inventory quantity, and the like. The device information storage 66 stores these pieces of detailed information in association with identification information of each device.

Among them, the inventory quantity is updated as needed by the device management system 14 or the like according to the purchase or delivery status and the actual installation or reservation status. Therefore, the device information obtainer 56 reads the latest inventory quantity and provides the same to the setting screen controller 50. According to a request from the setting screen controller 50 that has obtained the user input information, the rack information obtainer 58 obtains information related to a setting target rack from the rack information storage 64 and provides the information to the setting screen controller 50. For example, the rack information obtainer 58 provides information such as a configuration of a set rack, a rack type candidate for which a new configuration is to be set, and an empty slot of a setting target rack.

The rack information storage 64 stores information related to the configuration of the set rack in association with the identification information. As described above, the configuration of the rack is design information for realizing the installation of the rack, such as a rack type, a device to be housed, a housing destination slot, and a connection relationship. In the present embodiment, the rack configuration information that has been set once can be reused in the subsequent setting, thereby improving efficiency of setting work. For example, when a new data center is started up, it may be necessary to install many racks having the same configuration.

At this time, by reusing the configuration information set for one rack for another rack setting, it is not necessary to repeat the same setting work for each rack, and the work efficiency is remarkably improved. In addition, even when racks having different configurations are set as setting targets, if some configurations are common, setting work can be simplified by calling the set configuration information and revise only a part of the configuration information. Thus, the rack configuration information that is saved to be reused is hereinafter referred to as a "rack template". In addition to the rack template, the rack information storage 64 stores catalog information of racks as products such as selectable rack types.

According to a request from the setting screen controller 50 that has obtained the user input information, the installation location information obtainer 60 obtains information related to an installation planned location from the installation location information storage 62 and provides the information to the setting screen controller 50. For example, the installation location information obtainer 60 provides information such as room options where a rack can be installed, a floor shape, a rack installation status, and restrictions on electrical power, weight, and the like. The installation location information storage 62 stores these pieces of information in association with identification information of a room in the data center. Among them, the rack installation status is updated as needed by the facility management system 16 or the like according to the actual installation or reservation status.

The setting information outputter 54 stores the setting information input by the user in the rack information storage 64 in association with the designated rack type. The data corresponds to the above-described rack template. When a device set as a housing target in the rack template is secured from the inventory, the setting information outputter 54 may update the inventory quantity of the corresponding device, which is saved in the device information storage 66 so as to be subtracted by the secured amount.

At this time, the setting information outputter 54 may request the device management system 14 to secure the device so as to be reflected in material management and device order processing. In addition, when an area in the floor set as the installation location of the rack is secured, the setting information outputter 54 may reflect the set area as the reserved area in the rack installation status on the corresponding floor, which is saved in the installation location information storage 62.

FIG. 4 illustrates an example of a data structure of a rack template output by the equipment layout design support device 10. In this example, the rack template includes basic information 70, rack information 72, and slot information 74. The basic information 70 includes data such as an identification number of a rack template, a template name, identification information of the rack, a status of the template, a type of facility, a creator of the template, and creation date and time.

The rack information 72 includes data such as a type of setting target rack, a role, a number of slots in use (where a device is stored), a range of slots in use, a width of the rack, an allowable maximum weight of the device, and a maximum power usage. The slot information 74 includes, for each slot of the rack, data such as a slot number, a housed device, a device connected to the device or a number of a rack or a slot in which the connected device is housed, a connection port, and a type of cable used for connection.

The equipment layout design support device 10 generates a rack template including data of items as illustrated in the drawing in a predetermined format based on the input by the user, and stores the generated rack template in the rack information storage 64. As described above, this is reused in the subsequent setting, and the efficiency in the setting for another rack and the planning for arrangement on the floor is improved. The data structure in the drawing is an example, and the present embodiment is not intended to be limited thereto. Some items may be automatically set by the equipment layout design support device 10 based on the information provided from the device information obtainer 56, the rack information obtainer 58, and the installation location information obtainer 60.

Figure 5A:
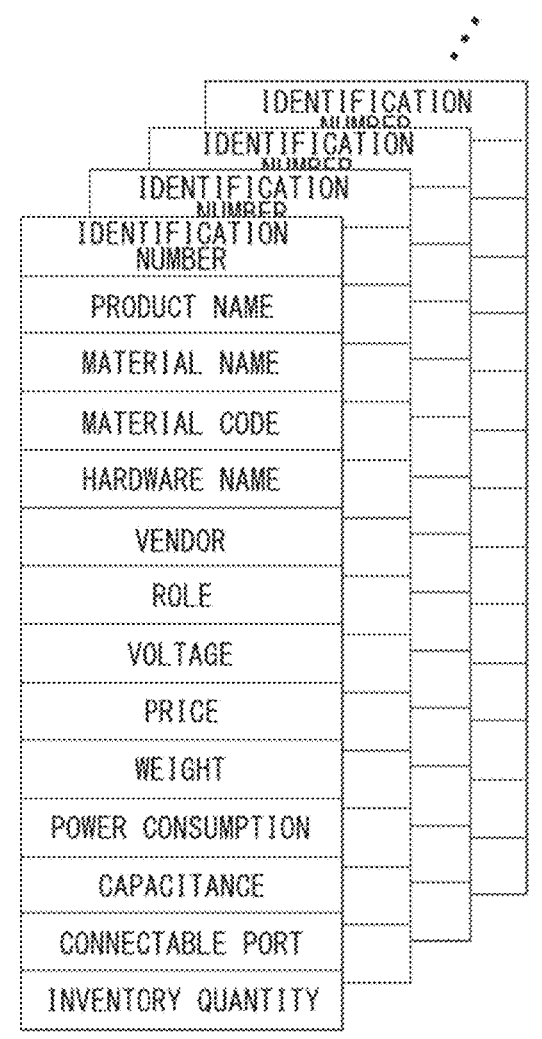
FIG. 5A and FIG. 5B are a diagram illustrating examples of data structures of information stored in device information storage and an installation location information storage according to the present embodiment.
Figure 5B:
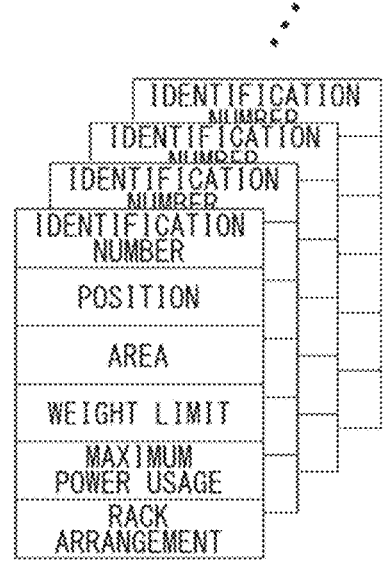

FIG. 5 illustrates examples of data structures of information stored in the device information storage 66 and the installation location information storage 62. FIG. 5(*a*) is an example of a data structure of the device information stored in the device information storage 66, including data such as an identification number, a product name, a material name, a material code, a hardware name, a vendor, a role, a voltage, a price, a weight, power consumption, a capacitance, a connectable port, and an inventory quantity. The device information storage 66 stores data of the structure for each device that may be housed in a rack, for example. Here, as described above, the inventory quantity is updated as needed according to the actual usage status, delivery status, and the like.

FIG. 5(*b*) is an example of a data structure of the installation location information stored in the installation location information storage 62, including data such as an identification number, a position in a building, a floor area (shape), a weight limit, an allowable maximum power usage, and rack arrangement on the floor. The installation location information storage 62 stores data of the structure for each room in the data center. Here, as described above, the rack arrangement is updated as needed according to the rack installation status, the area reservation status, and the like.

Figure 6:
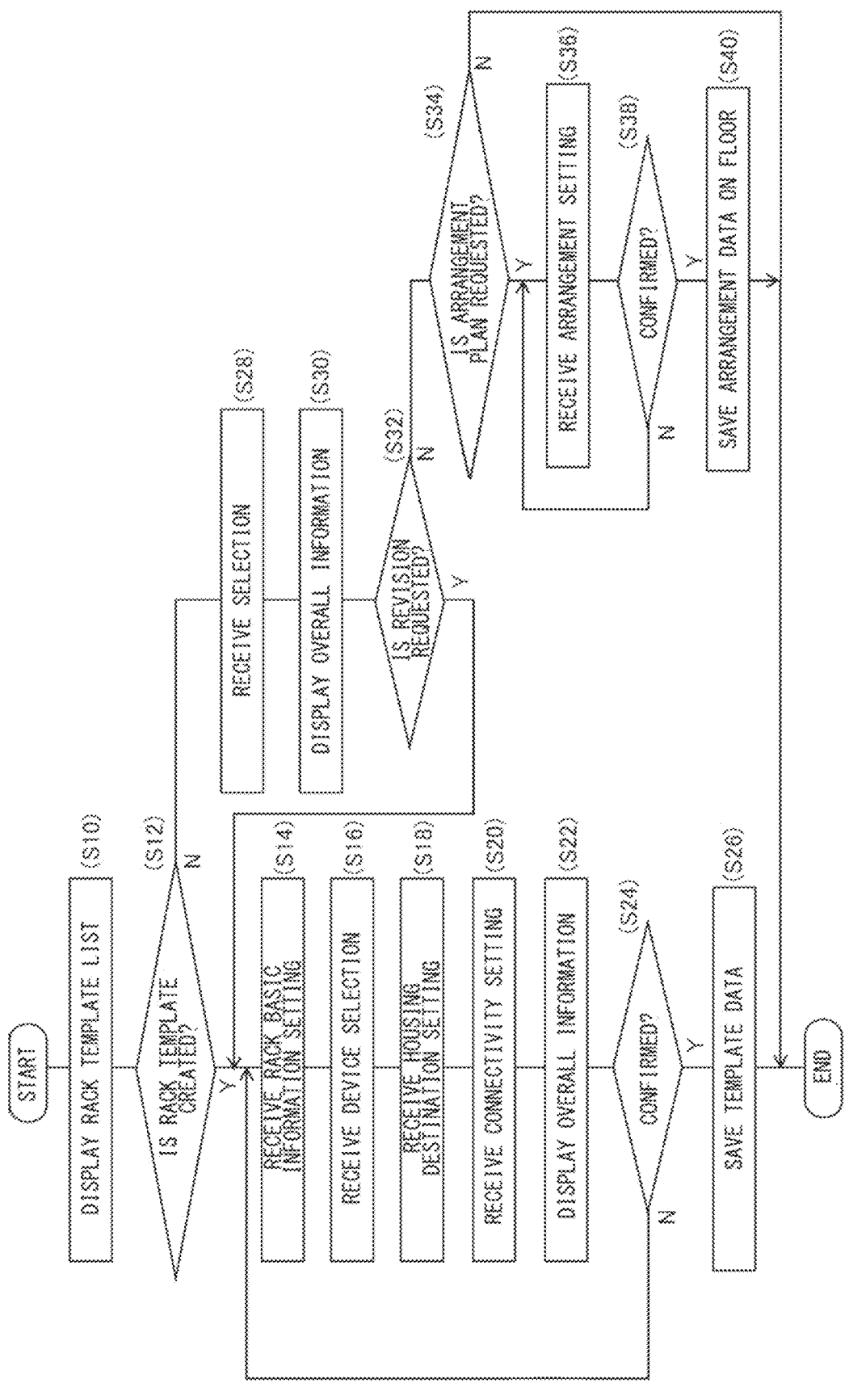
FIG. 6 is a flowchart illustrating a processing procedure in which the equipment layout design support device supports generation of a rack template and an arrangement plan of a rack in the present embodiment.

Next, the operation of the equipment layout design support device 10 realized by the above-described configuration will be described. FIG. 6 is a flowchart illustrating a processing procedure in which the equipment layout design support device 10 supports generation of a rack template and an arrangement plan of a rack. First, the setting screen controller 50 displays a list of rack templates according to an instruction input from a user or the like (S10). Thus, the rack information obtainer 58 reads basic information of rack templates created in the past and stored in the rack information storage 64, and supplies the basic information to the setting screen controller 50.

If the user inputs a request to create a new rack template on the screen on which the created rack templates are listed, the setting screen controller 50 displays a screen for setting various items of the rack template. Specifically, the setting screen controller 50 first displays a setting screen for basic information including characteristics of a setting target rack, a type of facility, and the like, and the input information obtainer 52 receives the setting (S14). At this time, the setting screen controller 50 obtains information on available racks and information such as restrictions on the installation location from the rack information obtainer 58 and the installation location information obtainer 60, respectively, and then displays the obtained information, so that the user can easily perform appropriate setting.

When the setting related to the rack is completed, the setting screen controller 50 then displays a screen for selecting a device to be housed, and the input information obtainer 52 receives the selection operation (S16). At this time, the setting screen controller 50 obtains the information on a device candidate that matches the user's search condition from the device information obtainer 56 and displays the obtained information, so that the user can select an optimum device from multiple viewpoints such as weight, electrical power, cost, and inventory quantity. When the device is selected, the setting screen controller 50 then displays a setting screen for a housing destination slot for the device, and the input information obtainer 52 receives the setting (S18).

In the case of a rack in which some slots are already set as housing destinations, the setting screen controller 50 displays such slots and empty slots in a distinguishable manner, so that the user can set an appropriate slot as a new housing destination. The situation in which some slots are already set as housing destinations includes not only a case where a housing destination of another device is previously set with a template that is being created, but also a case where an already created template is read and revised so that a new device is housed. In the latter case, the setting screen controller 50 obtains the information on the slot set as a housing destination in the already created template from the rack information obtainer 58 and reflects the information on the display.

When the setting of the housing destination of the device is completed, the setting screen controller 50 then displays a setting screen for cable connectivity between the devices, and the input information obtainer 52 receives the setting (S20). At this time, the setting screen controller 50 obtains information such as a type of connection port, communication speed, and a kind of cable for each device from the device information obtainer 56 and displays the obtained information, so that the user can easily perform appropriate setting. In S20, the setting screen controller 50 may separately display a setting screen for a device of a connection destination, a connection port of the device, a type of cable to be used for connection, and the like.

When the setting related to the connection is completed, the setting screen controller 50 displays overall information of the rack template so that the settings can be checked (S22). For example, the setting screen controller 50 displays an image of a rack in which the set device is housed, and also displays setting information of the rack and the device in response to a request of the user. At this time, by displaying a total weight, an electrical power, a total cost, and the like, the user can easily check whether proper setting is made for the entire rack.

When the user makes a request to confirm the rack template with the settings at this time (Y in S24), the setting information outputter 54 saves the data of the rack template by storing the data in the rack information storage 64 (S26). When the rack template is not confirmed and a request to perform some other setting is made (N in S24), the setting screen controller 50 and the input information obtainer 52 return the processing to any step of S14 to S20 (S14 in the figure), so that the user can revise the setting, or add a device or a connection.

In S12, if the user makes an input to select any of the rack templates on the screen displaying a list of created rack templates, the input information obtainer 52 receives the selection (S28). In response to this, the setting screen controller 50 displays overall information of the selected rack template in the same manner as in S22 (S30). Then, if the input information obtainer 52 obtains a request to revise the displayed rack template (Y in S32), the setting screen controller 50 and the input information obtainer 52 shift the processing to S14.

Thereafter, by performing the processing of S16 to N in S24 in response to the user's operation, change of the rack, change, addition, and deletion of the device to be housed, change, addition, and deletion of the connection, and the like are received. When the revise is completed and the user makes a request to confirm the rack template with the settings at this time (Y in S24), the setting information outputter 54 saves the data of the rack template by storing the data in the rack information storage 64 (S26). At this time, by allowing the user to select whether to save the rack template as another rack template or to overwrite the original rack template, it is possible to easily switch between creation of a new rack template using the already created rack template and simple setting revise.

If the user makes a request to plan rack arrangement in the installation location (Y in S34) instead of a request to revise the rack template (N in S32), the setting screen controller 50 displays a screen for selecting a floor of the installation destination and setting the rack arrangement on the floor, and the input information obtainer 52 receives the selection and setting (S36). At this time, the setting screen controller 50 obtains, from the installation location information obtainer 60, information such as a candidate of a room that can be designated as an installation location, a floor area and shape of the selected room, and an area where a rack is already installed, and displays the obtained information on the setting screen.

As a result, the user can appropriately select a room convenient for management and an area where the rack can be installed in the room. Further, when a plurality of racks having the same configuration are arranged, the same rack template can be used, so that it is possible to save the user from repeating the same setting for each rack.

The setting screen controller 50 and the input information obtainer 52 continuously receive the setting for the arrangement until the user performs confirmation operation of the rack arrangement on the floor (N in S38, S36). If the confirmation operation is performed (Y in S38), the setting information outputter 54 saves the data of the arrangement on the floor by storing the data in the installation location information storage 62 (S40). Here, the rack arrangement on the floor is information in which the rack template and the position on the floor of the rack having configuration according to the template are associated with each other. After the overall information of the selected rack template is displayed (S30), if neither a revision request nor a request for an arrangement plan is made, the processing is ended in response to a display end request (not illustrated) or the like (N in S32, N in S34).

Figure 7:
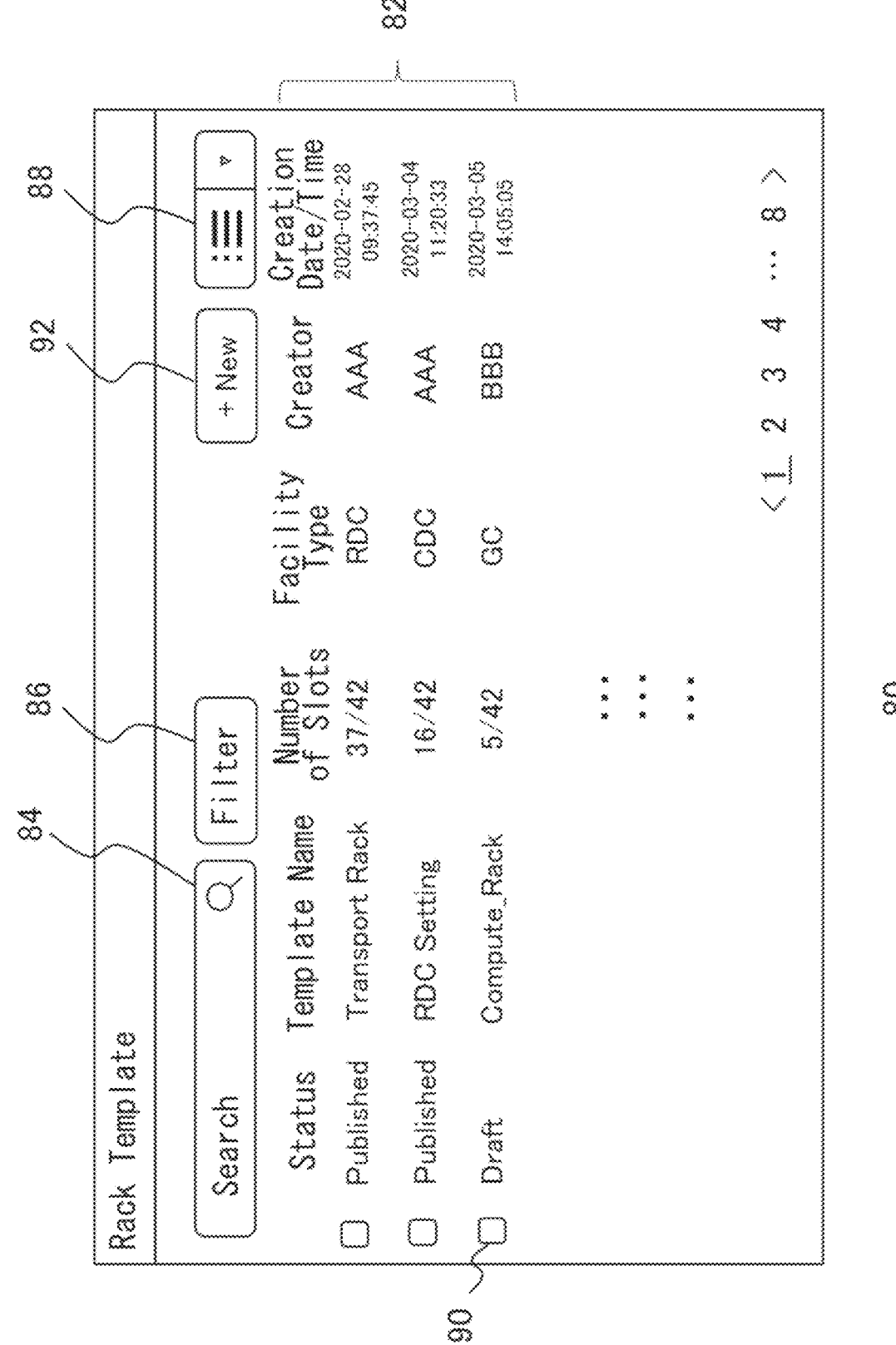
FIG. 7 is a diagram illustrating a screen example of a rack template list displayed in S10 of FIG. 6.

FIG. 7 illustrates a screen example of a rack template list displayed in S10 of FIG. 6. In this example, a rack template list screen 80 includes a list part 82 in which one row represents information of one rack template, a search condition input part 84 for inputting a search condition such as a search word, a filter condition input part 86 for inputting a filter condition, and a sorting rule input part 88 for switching a rule of a display order. The list part 82 displays, as information of each rack template, a "status" of the template, a template name, a number of slots used, a type of facility, a creator, and a creation date and time.

Here, the "status" refers to the latest status information of the rack template itself, such as "Published" indicating that the rack template is published to a member of a department to which the user belongs or the people concerned, or "Draft" indicating a drafting stage. The status information is appropriately set and updated by the creator or the like. A checkbox (e.g., a checkbox 90) is displayed at the beginning of each row of the list part 82, and when the user checks the checkbox, selection of a rack template is received. The number of rack templates over several pages may be saved, and the search condition input part 84, the filter condition input part 86, the sorting rule input part 88, and the like allows the user to efficiently detect a desired template.

The rack template list screen 80 further shows a "New" button 92 for starting creation of a new rack template. When the user instructs the "New" button 92, the input information obtainer 52 receives the instruction, and the setting screen controller 50 starts displaying a setting screen for creating a new rack template.

FIG. 8 illustrates an example of a setting screen for basic information of the rack displayed in S14 of FIG. 6. In this example, a basic information setting screen 100 includes a template detail setting part 102 and a rack detail setting part 104. The template detail setting part 102 includes input fields of a facility type and a template name. Here, the facility type corresponds to a type of service to be provided, and options such as remote desktop connection (RDC) and virtual desktop infrastructure (VDI) can be selected from a pull-down menu. As the template name, the user can input an arbitrary character string.

The rack detail setting part 104 includes input fields for a rack name, a status, a role, a rack type, a width, a load bearing capacity, a top stage weight upper limit, a power supply capacity, a number of slots to be used, and a top slot position. As the rack name, the user can input an arbitrary character string. The status represents a status of the settings of the rack, and options such as "Planned" can be selected from a pull-down menu.

The role is, for example, a transport rack (Transport Rack), a server rack (Server Rack), a backup battery rack (BBU Rack), and the like, and these options can be selected from a pull-down menu. The rack type is a structural feature, and options such as 2-Post Frame, 4-Post Frame, 2-Post Cabinet, and 4-Post Cabinet can be selected from a pull-down menu. As for the width, selectable numerical values can be selected from a pull-down menu.

For the power supply capacity, the load bearing capacity, and the top stage weight upper limit, numerical values desired by the user can be input. For example, when the weight is restricted depending on the installation location, the user inputs the load bearing capacity based on the restriction condition. Alternatively, the setting screen controller 50 may set a default value with reference to the installation location information. In addition, when a heavy device is housed in the top stage of the rack, a problem occurs in terms of stability, and thus the user may set an appropriate value for the top stage weight upper limit. The values of the power supply capacity, the load bearing capacity, and the top stage weight upper limit can be used not only for choosing a specific rack but also for the setting screen controller 50 giving the user a warning in the case of exceeding the set values in the subsequent housed device setting or in other cases.

The number of slots to be used refers to the number of slots that the user desires to use to set a housing destination of the device, and is selected from prescribed values such as "48", "46", and "42", or any value can be input manually. The top slot position refers to the top position of the slot desired to be used by the user to set a housing destination of the device. For example, numbers are assigned to the slots in advance in ascending order downwardly from the top stage of the rack, and the number at the top of the slot desired to be used can be selected from a pull-down menu.

When the setting in the template detail setting part 102 and the rack detail setting part 104 is completed, the user performs an operation to instruct an "Add Device" button 106 on the basic information setting screen 100. When the input information obtainer 52 receives the instruction, the setting screen controller 50 switches the display to a screen for setting a device to be housed.

Figure 9:
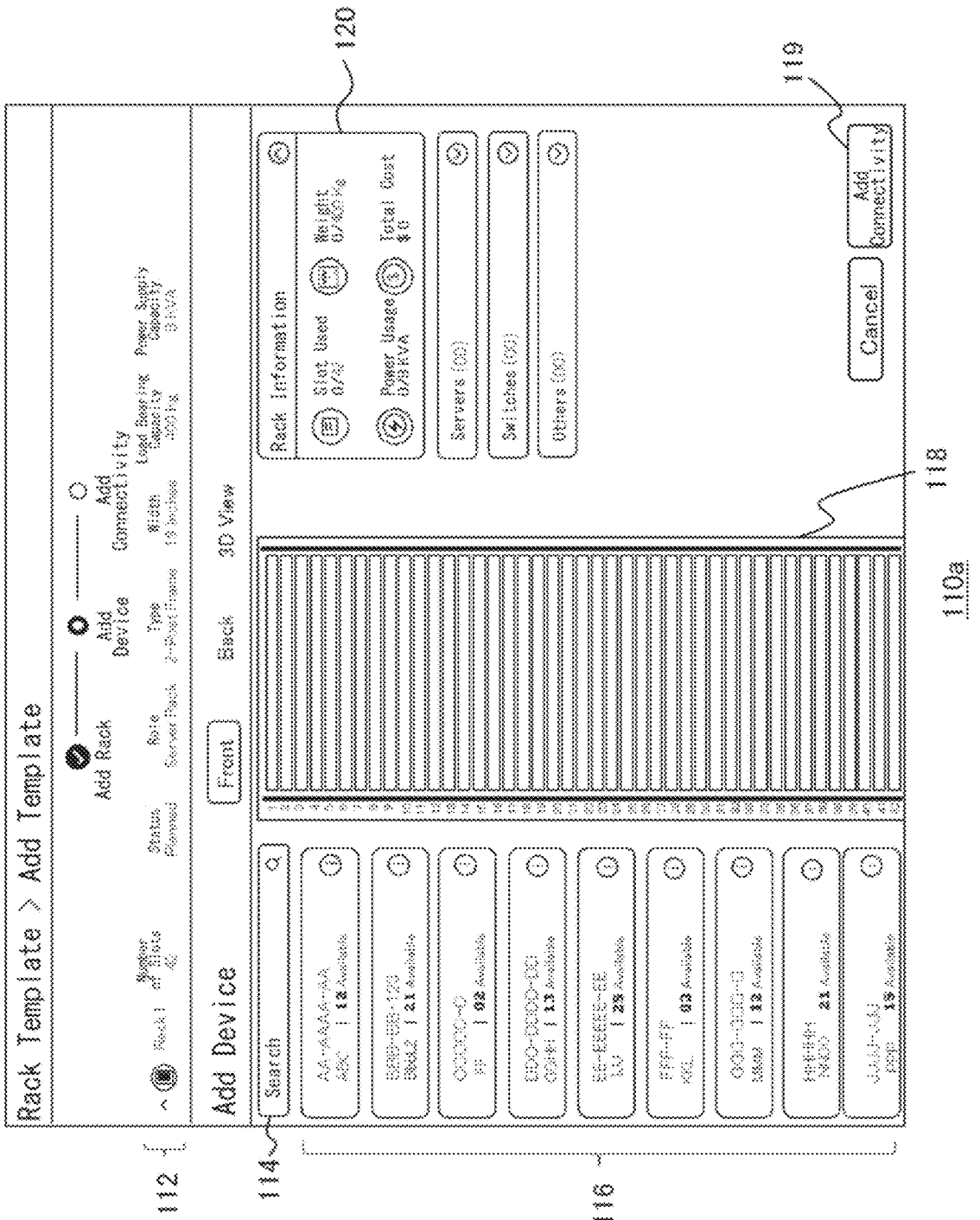
FIG. 9 is a diagram illustrating an example of a device selection screen displayed in S16 of FIG. 6.

FIG. 9 illustrates an example of a device selection screen displayed in S16 of FIG. 6. In this example, a device selection screen 110*a* includes a rack setting information display part 112, a search condition input part 114, a device candidate display part 116, a rack slot display part 118, and an evaluation item display part 120. The rack setting information display part 112 displays rack information such as a number of slots, a status, a role, a rack type, a width, a load bearing capacity, and a power supply capacity set on the basic information setting screen 100 illustrated in FIG. 8.

The search condition input part 114 allows the user to input a condition for searching for a device to be housed. For example, the user performs a search using any search key such as a product name, a material code, a hardware name, and a vendor. The device candidate display part 116 displays a list of devices matching the search condition. The device candidate display part 116 is displayed by the device information obtainer 56 reading the information on the devices matching the search condition from the device information storage 66 and providing the information to the setting screen controller 50. The illustrated example shows a name, a vendor, and an inventory quantity for each device.

The rack slot display part 118 displays a schematic image of a setting target rack. The figure illustrates an image in which 42 slots from No. 1 to No. 42 are viewed from the front. However, the image of the rack is not limited thereto, and it may be switchably displayed as, for example, an image viewed from the back, a three-dimensional object, or the like. In addition, when there is a device for which the housing setting has already been made, the rack slot display part 118 may indicate an image in which the device is housed.

The setting screen controller 50 displays a housing destination setting screen to be described later in response to an operation of the user to move an icon of the device selected from the device candidate display part 116 to the area of the rack slot display part 118 by dragging and dropping. When the device to be added and the housing destination are confirmed by the operation on the screen, the setting screen controller 50 reflects the settings in the rack slot display part 118.

The evaluation item display part 120 displays a progress of the evaluation items for the entire rack, which is changed by adding a device to the rack. The setting screen controller 50 calculates and displays, for example, at least any of the following parameters as an evaluation item.

Number of slots: Number of slots used by housing a device or ratio to all slots

Weight: Total weight in the rack based on the weight of each device or ratio to the load bearing capacity of the rack Electrical Power: Total electrical power based on power usage of each device or ratio to power supply capacity of the rack Cost: Total cost for the rack based on the price of each device The setting screen controller 50 updates the evaluation item display part 120 by obtaining the weight, the electrical power, and the cost of the user selected device from the device information storage 66 via the device information obtainer 56. The setting screen controller 50 may give the user a warning when any of the upper limits set for each item is exceeded or when a predetermined condition that is likely to be exceeded is satisfied. By adding a device or reselecting another device while checking the evaluation item display part 120, the user can easily perform appropriate setting without being forced to reset an unrealistic device later.

The restriction regarding the weight and the electrical power may be specified by the user on the basic information setting screen 100 illustrated in FIG. 8, or the setting screen controller 50 may set a default value from the viewpoint of the installation location and the like. In addition, when a weight upper limit of the device installed in the top stage of the rack is set on the basic information setting screen 100, the evaluation result from such viewpoint may also be displayed in the evaluation item display part 120. At this time, the setting screen controller 50 may give the user a warning when a setting in which a device having a weight exceeding the upper limit is housed in the top stage is performed.

Figure 10:
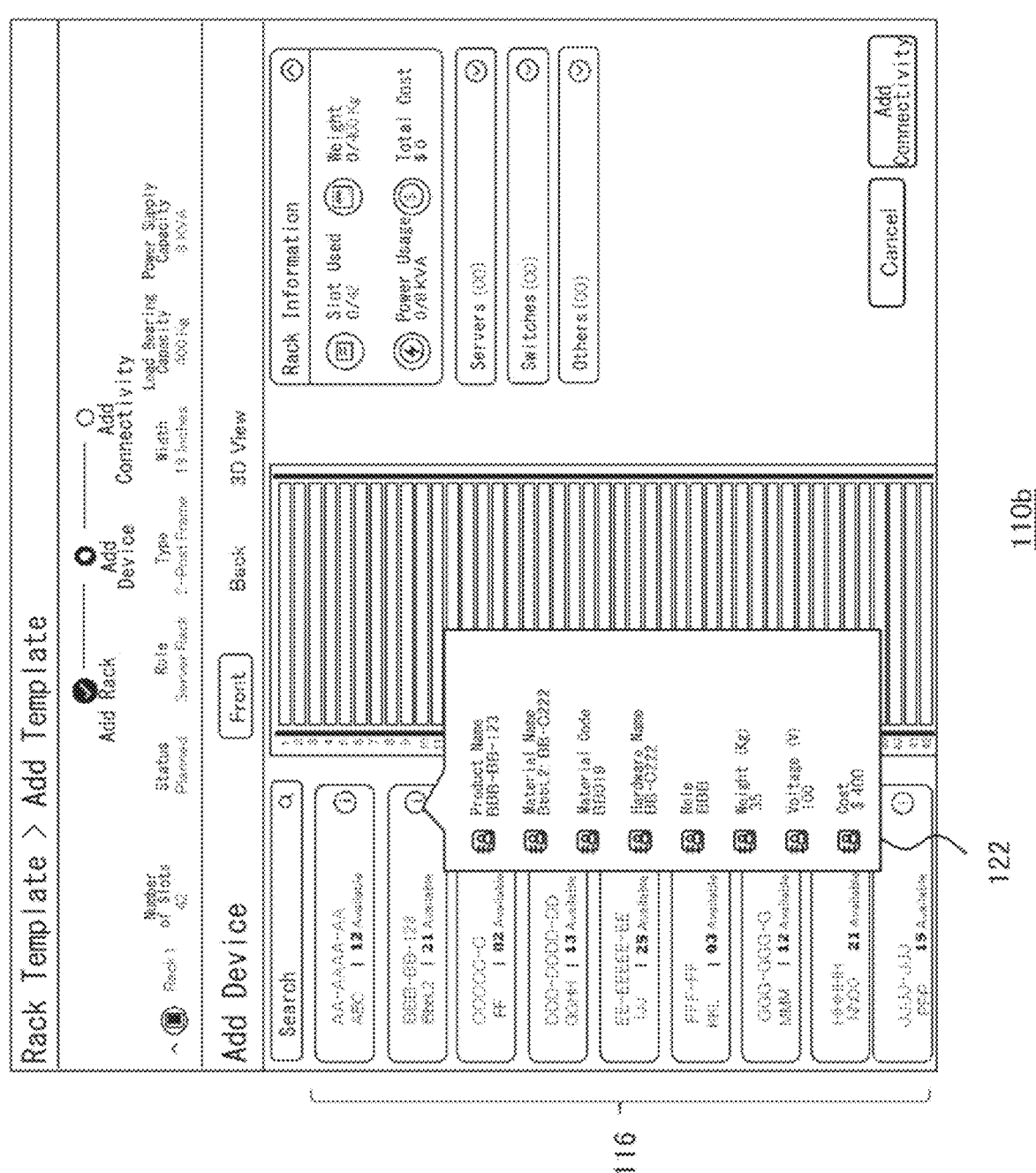
FIG. 10 is a diagram illustrating an example of a screen in which information is further displayed in a device candidate display part on the device selection screen of FIG. 9.

FIG. 10 illustrates an example of a screen in which information is further displayed in the device candidate display part 116 on the device selection screen 110*a* of FIG. 9. In this example, a device selection screen 110*b* displays additional information 122 on the device the user selected in the device candidate display part 116. For example, when the user instructs an "i" icon for indicating additional information in the list of each device, the setting screen controller 50 displays a balloon showing the additional information 122 in a superimposed manner.

In the example of the drawing, a product name, a material name, a material code, a hardware name, a role, a weight, a voltage, and a cost are displayed as the additional information. By making it possible to display such additional information 122, the user can simultaneously check information that serves as a basis for selecting while grasping a large number of device candidates of various vendors at a glance, thereby enabling efficient and appropriate selection.

Figure 11:
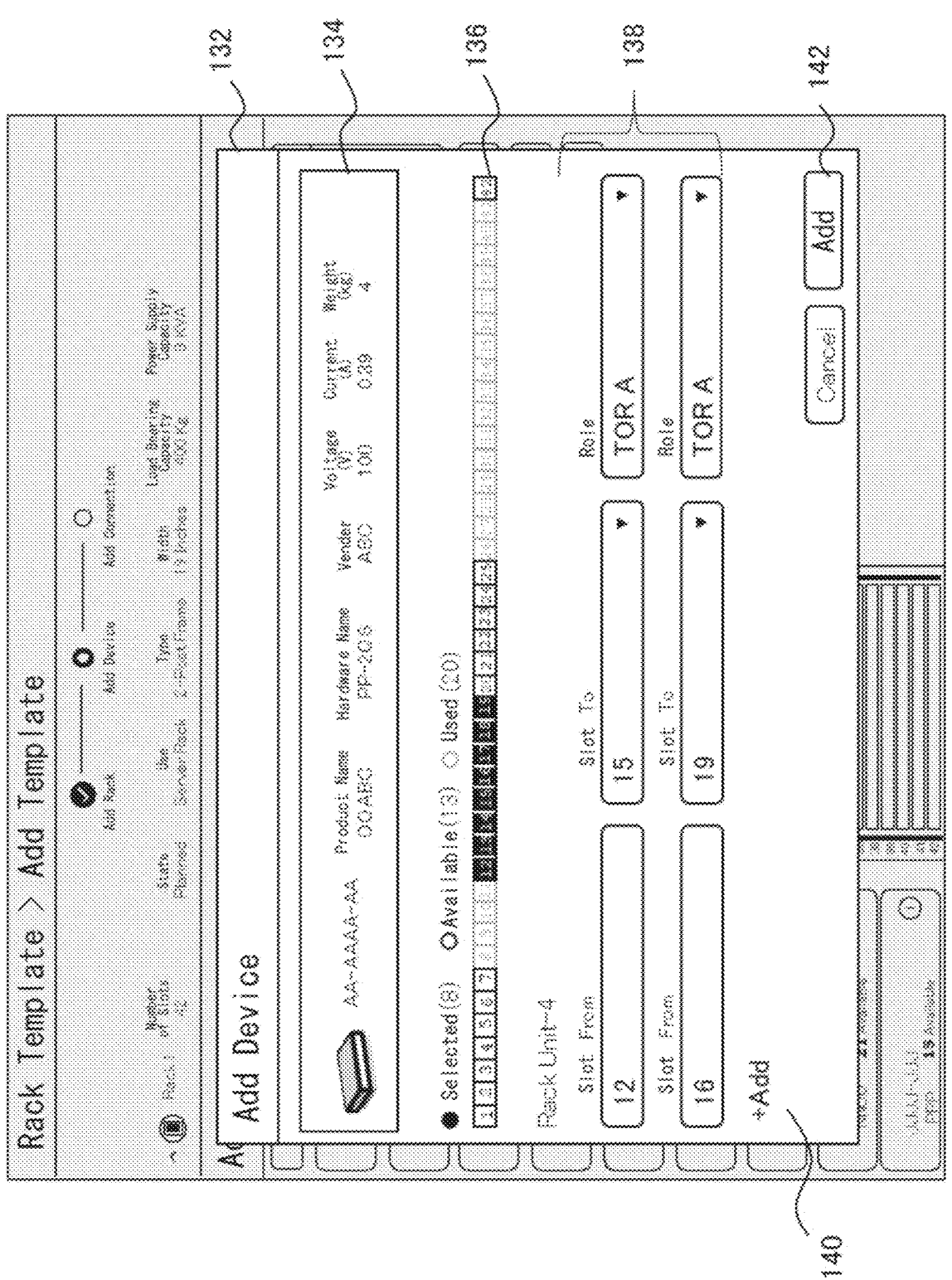
FIG. 11 is a diagram illustrating an example of a setting screen for a device housing destination slot displayed in S18 of FIG. 6.

FIG. 11 illustrates an example of a setting screen for a device housing destination slot displayed in S18 of FIG. 6. In this example, a housing destination setting screen 132 is displayed so as to be superimposed on the device selection screen 110*a* by an operation of the user to move a desired device icon to the area of the rack slot display part 118 on the device selection screen 110*a* illustrated in FIG. 9. The housing destination setting screen 132 includes a device information display part 134, a slot status display part 136, and a slot number input part 138.

The device information display part 134 displays catalog information such as a name, a product name, a hardware name, a vender, a voltage, a current, and a weight of a device being selected as a housing target. The slot status display part 136 shows the availability of each slot in the setting target rack at that point in time. In the figure, an array of slots is illustrated by a pattern of which rectangles with slot numbers are arranged in the horizontal direction, and three types of statuses including "Selected", "Available", and "Used" are represented by the colors.

Here, "Selected" indicates a slot that is being selected as a housing destination on the housing destination setting screen 132, that is, a slot before confirmed as a housing destination. "Available" indicates an empty slot that can be set as a housing destination of the device in the future setting. "Used" indicates a slot confirmed as a housing destination of the device in the previous setting. The slot number input part 138 allows the user to input the number of the housing destination slot of the device being selected. The slot number input part 138 may further allow the user to input a role of the device.

The setting screen controller 50 displays the number of slot stages (the number of rack units) required by the device being selected in the upper row of the slot number input part 138. Therefore, the setting screen controller 50 obtains the number of rack units required by the device being selected from the device information storage 66 via the device information obtainer 56. The user determines a housing destination slot range among available slots in the slot status display part 136 according to the displayed number of rack units, and inputs the numbers of the top and bottom stages to the slot number input part 138.

In the illustrated example, as described as "Rack Unit-4", one device can be housed with four consecutive units. Therefore, the user sets to house the same device, one in the slots numbered from "12" to "15" and another in the slots numbered from "16" to "19" among the originally available slots numbered from "1" to "7" and from "12" to "25". As a result, in the example of the drawing, the slots numbered from "12" to "19" in the slot status display part 136 are updated to the "Selected" status.

In this manner, by enabling entry of a plurality of housing destinations and uses of the device being selected in the slot number input part 138, a setting for housing a plurality of the same devices is also simultaneously received. When it is desired to further add the same device, the user increases the number of entries of the slot number input part 138 by instructing a "+ Add" button 140. At this time, if an entry exceeding the inventory quantity is made, the setting screen controller 50 may give the user a warning to that effect. With the configuration of the housing destination setting screen 132, the user can easily designate the number of the same devices to be housed and the housing destination at once.

When the setting of the housing destination of the device being selected is completed, the user performs an operation to instruct an "Add" button 142 on the housing destination setting screen 132 to thereby confirm the device selection and the housing destination setting. As a result, the setting screen controller 50 hides the housing destination setting screen 132 and returns the display to the device selection screen 110a illustrated in FIG. 9. However, in this case, the setting made on the housing destination setting screen 132 is reflected in the rack slot display part 118 and the evaluation item display part 120. If necessary, the user selects another device and sets the housing destination by the same procedure.

Figure 12:
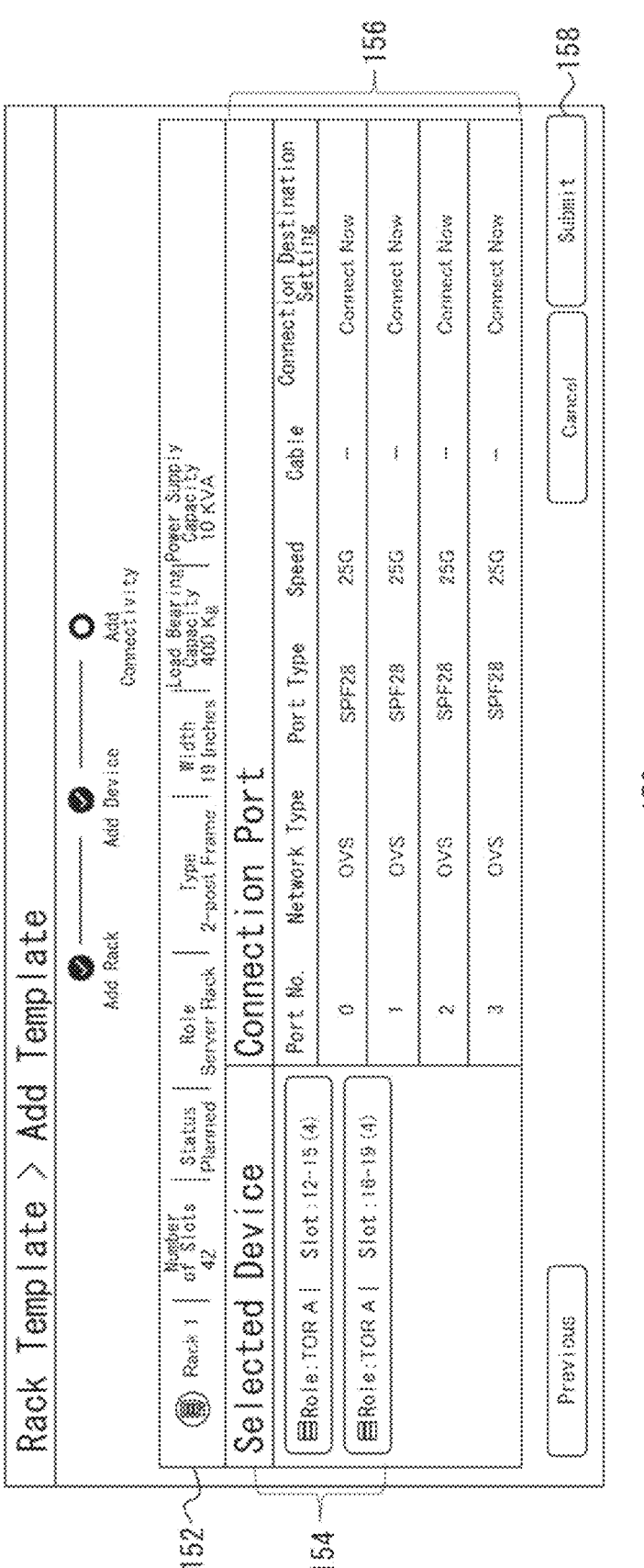
FIG. 12 is a diagram illustrating an example of a screen for setting a connection between devices displayed in S20 of FIG. 6.

When all the device selection and housing destination setting are completed, the user performs an operation to instruct an "Add Connectivity" button 119 on the device selection screen 110a. When the input information obtainer 52 receives the instruction, the setting screen controller 50 switches the display to a screen for setting a connection between devices. FIG. 12 illustrates an example of the screen for setting a connection between devices displayed in S20 of FIG. 6. A connection setting screen 150 includes a rack setting information display part 152, a selected device display part 154, and a connection port designation part 156. The rack setting information display part 152 displays rack information such as a number of slots, a status, a role, a rack type, a width, a load bearing capacity, and a power supply capacity set on the basic information setting screen 100 illustrated in FIG. 8.

The selected device display part 154 displays a list of all the devices selected on the setting screens for the devices and the housing destinations illustrated in FIGS. 9 to 11. The example of the drawing illustrates the set role and the set slot numbers of the housing destination together with each device icon. The connection port designation part 156 displays a list of options of ports included in the device selected by the user from the selected device display part 154. This example shows a port number, a network type, a port type, a communication speed, and a cable type. The setting screen controller 50 also obtains these pieces of information from the device information storage 66 via the device information obtainer 56.

Figure 13:
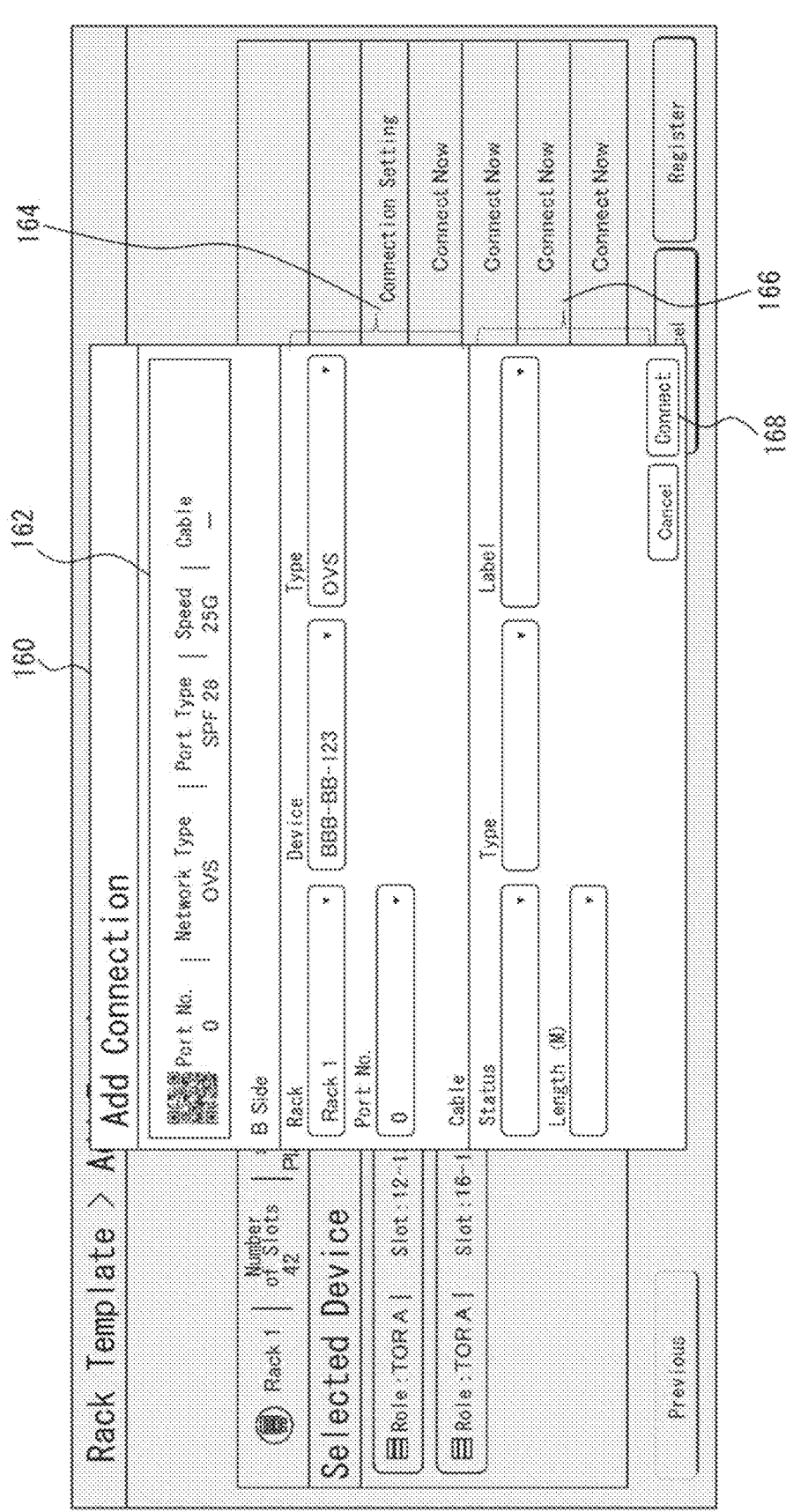
FIG. 13 is a diagram illustrating an example of a setting screen for a connection destination device displayed in S20 of FIG. 6.

The user selects a port desired to be connected, and performs an operation to instruct a "Connect Now" button at the end of the corresponding line of the connection port designation part 156. When the input information obtainer 52 receives the instruction, the setting screen controller 50 displays a screen for setting the device of the connection destination. FIG. 13 illustrates an example of a setting screen for a connection destination device displayed in S20 of FIG. 6. In this example, a connection destination setting screen 160 is displayed so as to be superimposed on the connection setting screen 150 illustrated in FIG. 12. The connection destination setting screen 160 includes a connection source information display part 162, a connection destination information input part 164, and a connection cable information input part 166.

The connection source information display part 162 displays information related to the connection source port selected by the user on the connection setting screen 150 of FIG. 12, that is, information such as a port number, a network type, a port type, a communication speed, and a cable type. The connection destination information input part 164 includes an input field for information related to the device of the connection destination. In this example, the user can select a name of a rack housing a device, a device name, a network type, and a port number from each pull-down menu including options.

For example, when a connection is made between the devices to be housed in the same rack, the user selects, as the "Rack Name", the rack name set in the rack template being created. On the other hand, if another rack name set in the saved rack template is selected, connection between different racks can be realized. The connection cable information input part 166 includes an input field for information related to the cable used for connection. In this example, the user can select a status, a type, a label, and a length of the cable from each pull-down menu including options.

When the user sets all the items and then performs an operation to instruct a "Connect" button 168 on the connection destination setting screen 160, the setting screen controller 50 hides the connection destination setting screen 160 and returns the screen to the connection setting screen 150 of FIG. 12. However, in this case, the port for which the connection relationship has been set is excluded from a new connection setting target by changing the color or the like. If necessary, the user designates another port of the same device or a port of another device as a connection source and repeats the same setting.

Figure 14:
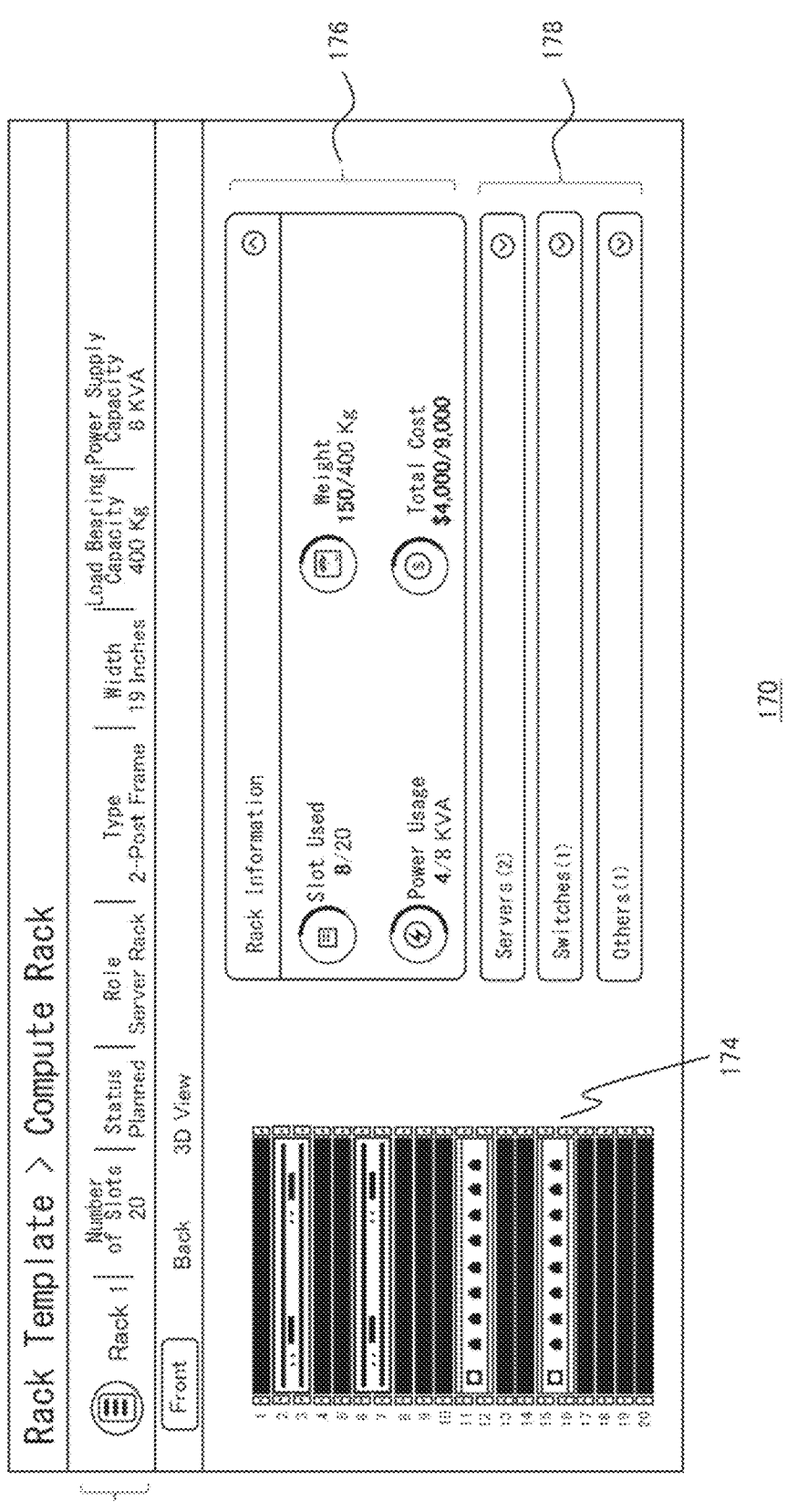
FIG. 14 is a diagram illustrating an example of a display screen for overall information of the settings displayed in S22 of FIG. 6.

When all the connection settings are completed, the user performs an operation to instruct a "Submit" button 158 on the connection setting screen 150. When the input information obtainer 52 receives the instruction, the setting screen controller 50 switches the display to a screen for checking the entire settings. FIG. 14 illustrates an example of a display screen for overall information of the settings displayed in S22 of FIG. 6. In this example, an overall information display screen 170 includes a rack setting information display part 172, a rack slot display part 174, an evaluation item display part 176, and a device information display part 178.

The rack setting information display part 172 displays rack information such as a number of slots, a status, a role, a type, a width, a load bearing capacity, and a power supply capacity set on the basic information setting screen 100 illustrated in FIG. 8. The rack slot display part 174 displays a schematic image of a setting target rack. Here, the rack slot display part 174 shows an image in which the devices selected so far are housed in the set slots. Although the figure shows an image in which slots from No. 1 to No. 20 are viewed from the front, the slots may be switchably displayed as an image viewed from the back, a three-dimensional object, or the like.

The evaluation item display part 176 displays the results of the evaluation items for the entire rack when all the devices selected so far are housed. The evaluation items may be the same as those illustrated in the evaluation item display part 120 on the device selection screen 110a of FIG. 9. The device information display part 178 displays information related to the selected device in a pull-down manner. By displaying these pieces of information, the user can appropriately and easily judge whether to add a further device or whether to change a device or a housing destination.

For example, when heavy devices are concentrated on upper stages to deteriorate the balance, their housing destinations are replaced to thereby achieve a suitable balance. Alternatively, the product can be easily changed to another product having a small weight. Furthermore, when there is no consecutive empty slots required for adding a device, it is also easy to make a change so as to move the other devices for further housing, or to consider an inexpensive product if the total cost is more than expected.

When an operation to confirm a rack template is performed by the "Submit" button 158 on the connection setting screen 150 of FIG. 12 or by confirmation means (not illustrated) on the overall information display screen 170 of FIG. 14, the setting information outputter 54 associates the rack template with all the settings made so far and stores the associated data as a set of rack template data in the rack information storage 64.

Figure 15:
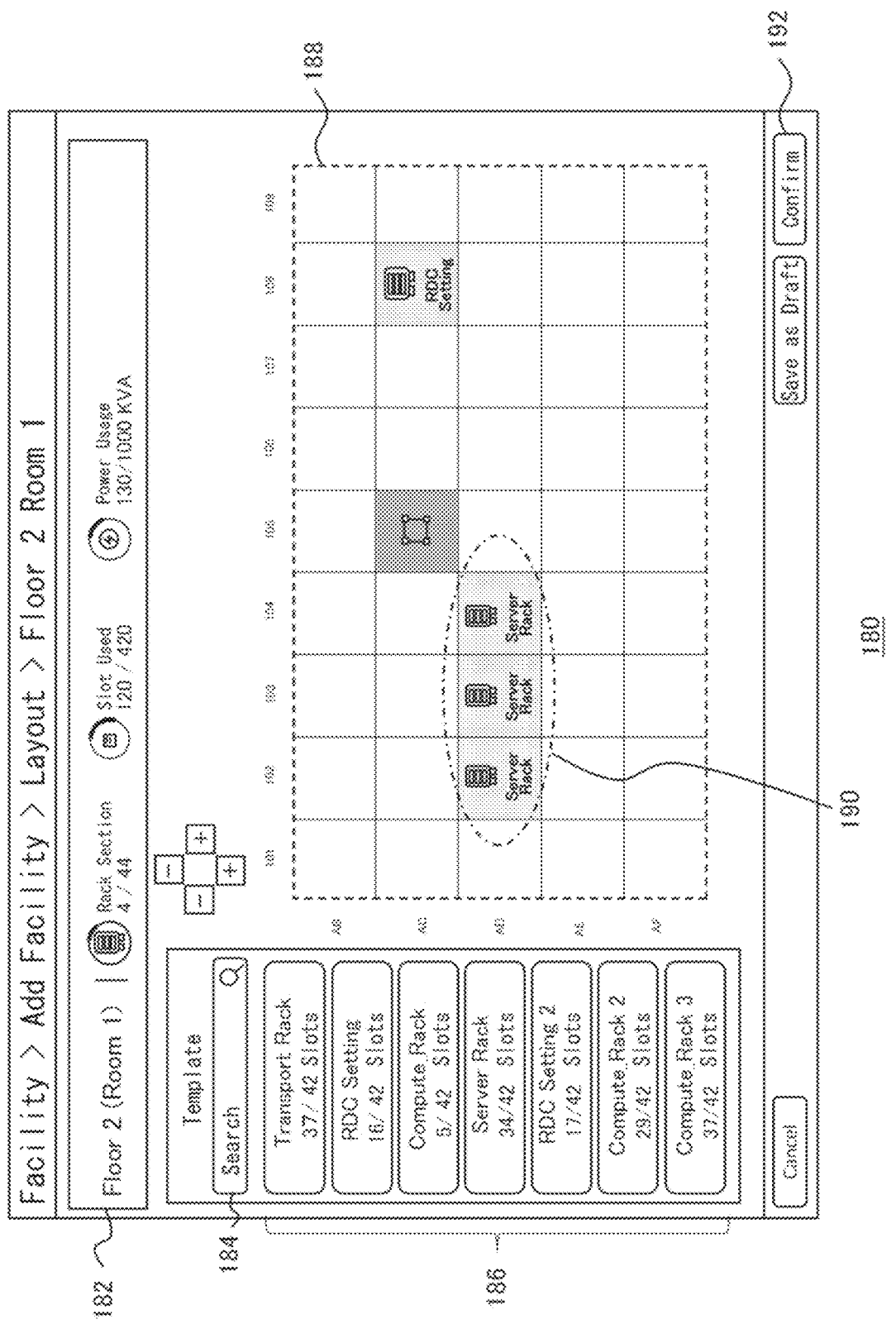
FIG. 15 is a diagram illustrating an example of a setting screen for rack arrangement on a floor displayed in S36 of FIG. 6.

FIG. 15 illustrates an example of a setting screen for rack arrangement on a floor displayed in S36 of FIG. 6. In this example, an arrangement on a floor setting screen 180 includes an in-floor evaluation item display part 182, a search condition input part 184, a template candidate display part 186, and a floor plan 188. The in-floor evaluation item display part 182 displays a name of the setting target room (floor) and a progress of the evaluation items for the entire floor, which is changed by adding a rack on the floor.

In this example, the number of rack arranged sections with respect to the number of rack sections prepared on the floor, the number of arranged slots with respect to the allowable number of slots on the entire floor, and the power usage of the arranged rack with respect to the allowable power on the floor are displayed. However, the evaluation items are not limited thereto, and may be evaluated in terms of weight and cost as well.

The search condition input part 184 allows the user to input a condition for searching for a rack template to be arranged. For example, the user performs a search using any search key such as a rack template name, a facility type, a creator, and a creation date and time. The template candidate display part 186 displays a list of rack templates matching the search condition. The template candidate display part 186 is displayed by the rack information obtainer 58 reading the information on the devices matching the search condition from the rack information storage 64 and providing the information to the setting screen controller 50. The illustrated example shows a name and the number of slots used for each rack template.

The floor plan 188 shows sections for installing racks in a state where the setting target floor is viewed from above. In the illustrated example, the floor is equally divided into 9×5 sections. The user moves an icon of the rack template selected from the template candidate display part 186 to a desired section of the floor plan 188 by dragging and dropping. Then, the setting screen controller 50 displays a name of the target rack template and an image of the corresponding rack in the section of the movement destination.

When it is desired to arrange a plurality of racks having the same configuration, the racks can be easily arranged in any section only by selecting the same rack template and repeating the above procedure. In the illustrated example, racks having a configuration of a rack template "Server Rack" are arranged side by side in three consecutive sections 190. The user arranges a rack template having a desired configuration into a desired section of the floor plan 188 while checking the evaluation items in the in-floor evaluation item display part 182.

The setting screen controller 50 may give the user a warning when any of the evaluation item data is exceeded or when a predetermined condition that is likely to be exceeded is satisfied. When all the settings for the rack arrangement to be planned are completed, the user performs an operation to instruct a "Confirm" button 192 on the floor arrangement setting screen 180. When the input information obtainer 52 receives the settings, the setting information outputter 54 associates the identification information of the arrangement target rack template with the position of the section of the arrangement destination, and stores the information as a data of arrangement on a floor in the installation location information storage 62.

When a rack or a device is actually installed on a floor, first, the data of arrangement on the floor is called, and a set rack is installed based on the correspondence between a rack template and a section. Next, based on the relationship between the slot and the device in the same rack template, the chosen device is housed in the slot. Then, the devices are connected based on the information on the connection relationship in the template.

According to the present embodiment described above, when a equipment layout is designed in a facility including a plurality of devices, settings related to a device to be housed in a rack, a housing destination slot, and cable connection are received from a user, and saved as a rack template in association with characteristics of the rack. By reusing the rack template, it is possible to improve efficiency of setting for arranging a plurality of racks having the same configuration on the floor or setting for racks having partially different configurations without performing setting for each rack from the beginning.

In addition, information that can be relied on by a user is appropriately displayed on the setting screen in choice of a device to be housed in a rack, connection relationship, rack arrangement, and the like. For example, in the choice of the device, catalog information, inventory, and the like of a candidate device can be displayed on the setting screen, so that it is possible to easily select an optimum device from a wide range of devices without the need to separately examine again. In addition, whether or not to select a candidate device can be judged on the spot from the viewpoint of restrictions such as weight, electrical power, and inventory quantity.

By cooperation with a system that manages the inventory of the device or a system that manages the facility, it is possible to grasp the inventory of the device and the installation status of the rack on the floor in real time, which can prevent setting that does not match reality. Further, based on the rack template, cooperation with device order processing and rack installation work can be simplified, and the position of the device during operation can be grasped without separate registration.

The present invention has been described above based on the embodiments. It will be understood by those skilled in the art that the examples are illustrative, that various modifications may be made to combinations of the components or processing processes thereof, and that such modifications also intended to fall within the scope of the present disclosure.

INDUSTRIAL APPLICABILITY

As described above, the present invention is available for various apparatuses such as a data center management apparatus or an equipment layout design support apparatus, a system including such apparatus, and the like.

REFERENCE SIGNS LIST 1 data center management system, 10 equipment layout design support device, 11 input device, 12 display device, 14 device management system, 16 facility management system, 18 data center, 23 CPU, 26 main memory, 32 communicator, 50 setting screen controller, 52 input information obtainer, 54 setting information outputter, 56 device information obtainer, 58 rack information obtainer, 60 installation location information obtainer, 62 Installation location information storage, 64 rack information storage, 66 device information storage

The invention claimed is:

1. An equipment layout design support device comprising:

one or more processors comprising hardware, wherein the one or more processors are configured to implement:

a setting screen controller structured to control a setting screen that receives a setting related to characteristics of a rack used for housing a device and a device to be housed in the rack;

an input information obtainer structured to obtain setting information input by a user on the setting screen; and a setting information outputter structured to store the setting information in a rack information storage, wherein the setting screen controller displays the setting screen that receives selection of the device to be housed and designation of a housing destination slot in the rack, and wherein the setting screen controller displays a number of slots necessary for housing a device being selected and information on selectable slot as the housing destination, and also displays a setting screen for receiving setting for housing a plurality of a same devices by providing a field capable of designating a plurality of ranges from among the selectable slots.

2. The equipment layout design support device according to claim 1, wherein the setting screen controller displays a setting screen related to a connection relationship between devices.

3. The equipment layout design support device according to claim 1, further comprising a device information obtainer structured to obtain detailed information related to a candidate of the device to be housed in the rack from a device information storage, wherein the setting screen controller displays the detailed information related to the candidate of the device on the setting screen.

4. The equipment layout design support device according to claim 3, wherein the setting screen controller causes the setting screen to display at least any of a total weight value, a total electrical power value, and a total cost of devices selected as housing targets.

5. The equipment layout design support device according to claim 4, wherein the setting screen controller gives a user a warning when the total value exceeds a predetermined upper limit.

6. The equipment layout design support device according to claim 5, further comprising an installation location information obtainer structured to obtain information related to an installation location of the rack from an installation location information storage, wherein the setting screen controller determines the upper limit based on the information related to the installation location.

7. The equipment layout design support device according to claim 3, wherein the device information obtainer obtains, as the detailed information, information related to an inventory quantity of the device to be housed in the rack.

8. The equipment layout design support device according to claim 1, wherein the input information obtainer obtains setting information related to an arrangement plan of a rack in an installation location, and the setting information outputter further associates setting information of each rack read from the rack information storage with a position of the rack set in the arrangement plan, and outputs the information as floor arrangement information.

9. The equipment layout design support device according to claim 1, wherein the setting screen controller causes the setting screen to display setting information selected by a user from among the setting information of individual racks stored in the rack information storage, and the input information obtainer obtains input information for revising the setting information.

10. A equipment layout design support method:

controlling a setting screen that receives a setting related to characteristics of a rack used for housing a device and a device to be housed in the rack;

obtaining setting information input by a user on the setting screen; and storing the setting information in a rack information storage, wherein the controlling the setting screen comprises displaying the setting screen that receives selection of the device to be housed and designation of a housing destination slot in the rack, and wherein the displaying the setting screen comprises displaying a number of slots necessary for housing a device being selected and information on selectable slot as the housing destination, and displaying a setting screen for receiving setting for housing a plurality of a same devices by providing a field capable of designating a plurality of ranges from among the selectable slots.

11. A non-transitory computer-readable recording medium storing a program for causing a computer to execute processing comprising:

controlling a setting screen that receives a setting related to characteristics of a rack used for housing a device and a device to be housed in the rack;

obtaining setting information input by a user on the setting screen; and storing the setting information in a rack information storage, wherein the controlling the setting screen comprises displaying the setting screen that receives selection of the device to be housed and designation of a housing destination slot in the rack, and wherein the displaying the setting screen comprises displaying a number of slots necessary for housing a device being selected and information on selectable slot as the housing destination, and displaying a setting screen for receiving setting for housing a plurality of a same devices by providing a field capable of designating a plurality of ranges from among the selectable slots.

* * * * *